United States Patent
Trika

(10) Patent No.: US 6,219,058 B1
(45) Date of Patent: *Apr. 17, 2001

(54) BIN-PER-SPAN BASED REPRESENTATION AND COMMUNICATION OF GRAPHICAL DATA

(75) Inventor: Sanjeev N. Trika, Hillsboro, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,100

(22) Filed: Sep. 8, 1997

(51) Int. Cl.[7] .................................................. G06T 15/30
(52) U.S. Cl. ........................................... 345/423; 345/441
(58) Field of Search .................................. 345/423, 440, 345/441

(56) References Cited

U.S. PATENT DOCUMENTS 5,864,342 * 1/1999 Kajiya et al. ........................ 345/418

* cited by examiner

*Primary Examiner*—Mark Zimmerman
*Assistant Examiner*—Huedung X. Cao
(74) *Attorney, Agent, or Firm*—Blakely, Sokoloff, Taylor & Zafman LLP

(57) ABSTRACT

A technique for maintaining and communicating graphical data in a computer system is provided. Graphical data in a computer system is represented as a set of triangles, each of which has a span. A single bin is created for each unique span and each of the triangles is assigned to its corresponding bin. Accordingly, when data representing the triangles is communicated from the host to the graphics controller in a chunking-based architecture, each triangle is provided to the graphics controller only once.

22 Claims, 5 Drawing Sheets

BIN-PER-SPAN BASED REPRESENTATION AND COMMUNICATION OF GRAPHICAL DATA

FIELD OF THE INVENTION

The present invention pertains to the field of computer graphics. More particularly, the present invention relates to techniques for maintaining, manipulating, and communicating graphical data in a computer system.

BACKGROUND OF THE INVENTION

A technique known as "chunking" has been used in the field of three-dimensional (3-D) computer graphics to improve the performance of graphics subsystems. In chunking, a complete display is divided into a number of portions, called "chunks", and the display is rendered one chunk at a time. A chunk may be, for example, a 32-by-32 pixel portion of the display. An advantage of chunking is that a chunk is generally small enough to be stored on chip (i.e., on the graphics accelerator/controller). Also, chunking reduces the bus bandwidth requirements between the video memory and the rasterizer, which is the primary bottleneck in most conventional 3-D graphics subsystems. However, chunking generally achieves these benefits at the expense of increased host-to-controller data traffic and increased video memory requirements for geometry data.

Graphics data is generally represented using sets of primitives, such as polygons and/or lines. A triangle is a commonly used primitive, for example. Each triangle has a "span", which can be defined as the set of chunks overlapped by the triangle's bounding rectangle. Traditional chunking approaches allocate a bin (of triangles) for each chunk of the display. Consequently, a triangle to be rendered is assigned to each bin that corresponds to a chunk in the triangle's span. Thus, if a triangle's span includes five chunks, for example, the triangle is assigned to the bins corresponding to each of those five chunks. The host then directs the graphics controller to process the associated bin for each chunk. The problem with this approach is that the host must deliver a triangle to the graphics controller once for each chunk in the triangle's span. Thus, if a triangle's span includes N chunks, the host must deliver that triangle to the graphics controller N times. In addition, the triangle data must be replicated in video memory N times, once in each of the N bins Therefore, it is desirable to have a 3-D computer graphics technique which not only reduces video memory requirements and video memory-to-rasterizer bandwidth requirements, but also reduces bandwidth requirements between the host and the graphics controller. It is further desirable to have such a technique which can be implemented without requiring changes to existing hardware. Such a technique would enable the delivery of a greater number of triangles to the graphics controller for a given bandwidth and, therefore, the creation of greater realism for the user in graphics applications.

SUMMARY OF THE INVENTION

The present invention includes a method of maintaining data for generating a graphical display. In the method, the data is represented as a set of primitives. A span is determined for each of the primitives. A single bin is created for each span, and each of the primitives is assigned to its corresponding bin. This technique results in transmission of data from a host to a graphics controller in a chunking-based architecture without replication. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A technique for maintaining and communicating graphical data in a computer system is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram or other symbolic form in order to facilitate description of the present invention.

As will be described in detail below, the present invention includes a technique for improving the performance of a chunking based graphics subsystem by maintaining a single bin for each span for graphical data represented as triangles. As a result, each triangle is delivered by the host to the graphics controller exactly once and is not replicated in video memory. The resulting greater available bandwidth and memory can be used to deliver more triangles to the controller and, therefore, to create greater realism for the user of graphics applications.

Figure 1:
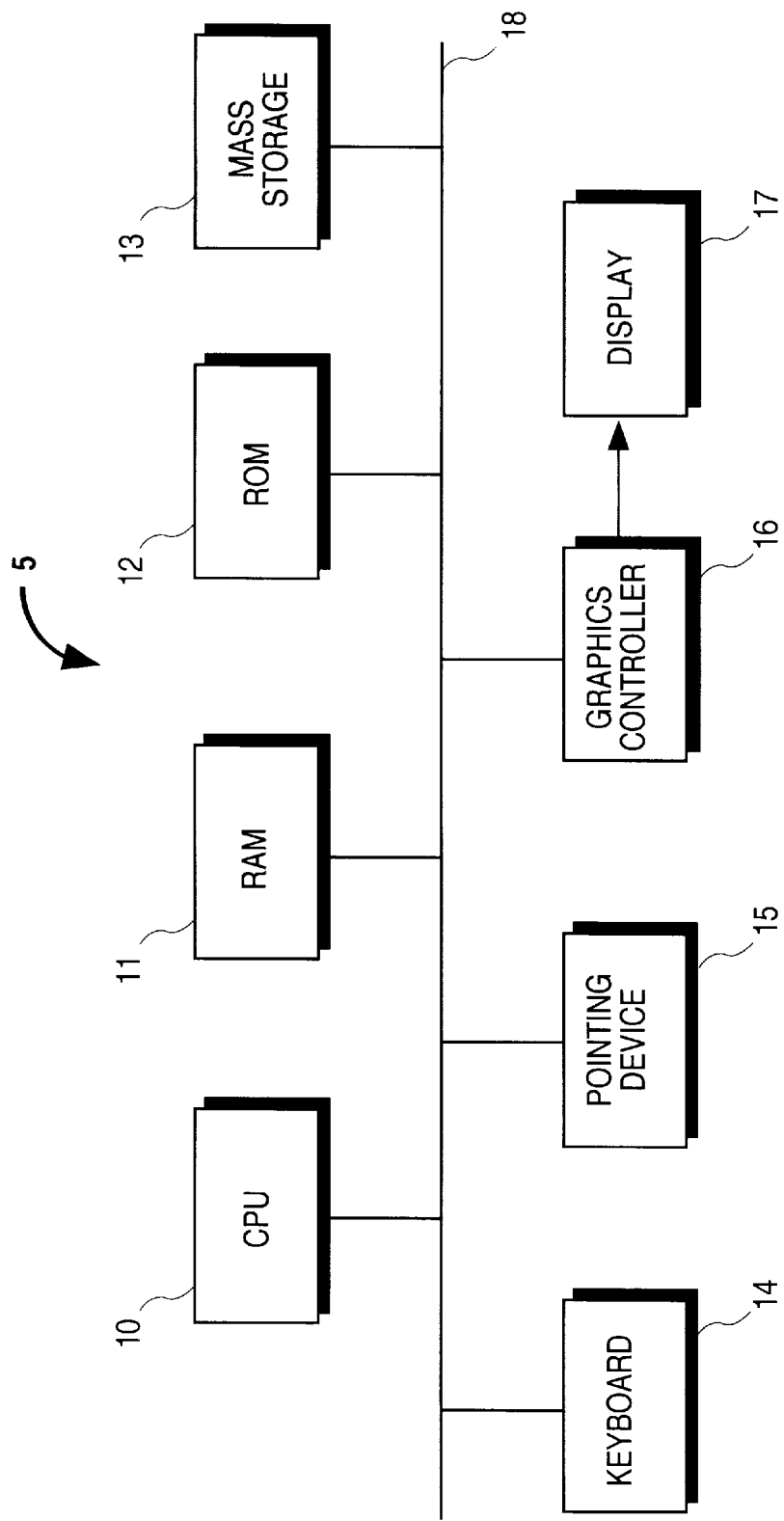
FIG. 1 is a block diagram illustrating a computer system in which the present invention is implemented.

FIG. 1 illustrates a computer system 5 in which the present invention is implemented, according to one embodiment. The computer system 5 includes a central processing unit (CPU) 10, random access memory (RAM) 11, read-only memory (ROM) 12, and a mass storage device 13, each coupled to a bus 18. The bus 18 may actually comprise one or more physical buses interconnected by various bridges, controllers and/or adapters. Also coupled to the bus 18 are a keyboard 14, a pointing device 15, and a graphics controller 16. The graphics controller 16 is also coupled to a display device 17 of the computer system. In general, graphical data is generated, maintained, and manipulated by the host CPU 10 and provided to the graphics controller 16 for rendering.

The display device 17 may be any device suitable for displaying data visually to a user, such as a cathode ray tube (CRT), liquid crystal display (LCD), or the like. The mass storage device 13 may be any device suitable for storing large volumes of data in a non-volatile manner, such as a magnetic, optical, or magneto optical (MO) storage device (e.g., magnetic disk, CD-ROM, CD-R, DVD, etc.). The pointing device 15 may be any device suitable for positioning a cursor, or pointer, on a display device, such as a mouse, trackball, stylus with light pen, touch-sensitive display screen, audio input device in combination with voice recognition software, etc.

Figure 2:
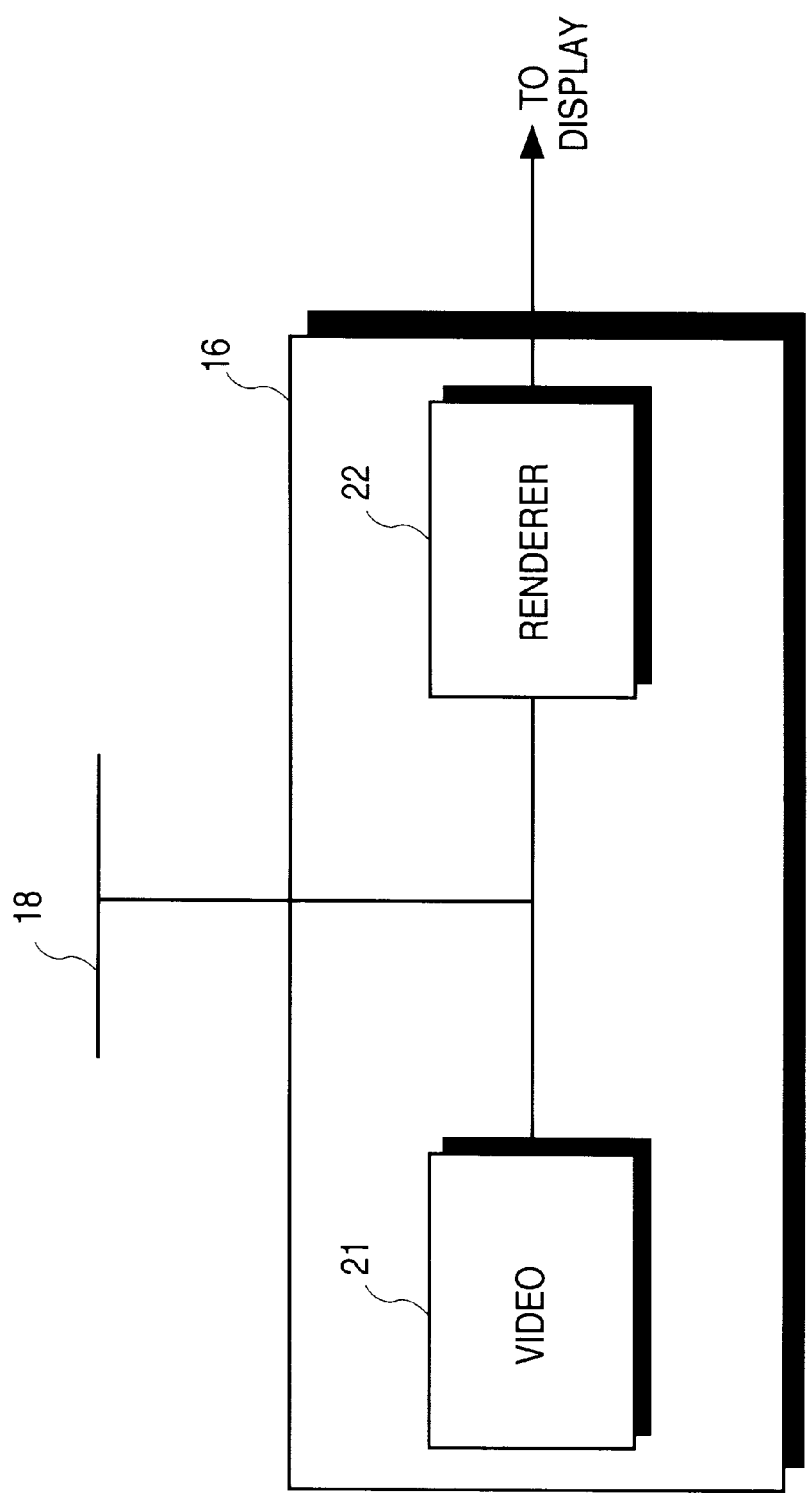
FIG. 2 is a block diagram illustrating components of the graphics controller of FIG. 1.

FIG. 2 illustrates in greater detail the graphics controller 16 according to one embodiment. The graphics controller 16 includes memory 21 for storing graphics data to be rendered and a renderer 22, which provides rasterized data to the display. The memory 21 and renderer 22 are each coupled (directly or indirectly) to the bus 18. In this case, the bus 18 may represent a conventional peripheral bus, such as the Peripheral Component Interconnect (PCI) bus. As already noted, traditional chunking techniques would tend to reduce the bandwidth requirements between the memory 21 and the renderer 22. However, these techniques would do so at the expense of higher bandwidth requirements between the graphics controller 16 and other components of the computer system 5 (particularly the CPU 10 and RAM 11) and higher storage capacity requirements for memory 21. In contrast, the present invention not only reduces the bandwidth requirements between the memory 21 and the renderer 22 but also reduces bandwidth requirements between the graphics controller 16 and the other components of the computer system 5 and reduces storage capacity requirements on memory 21.

Figure 3A:
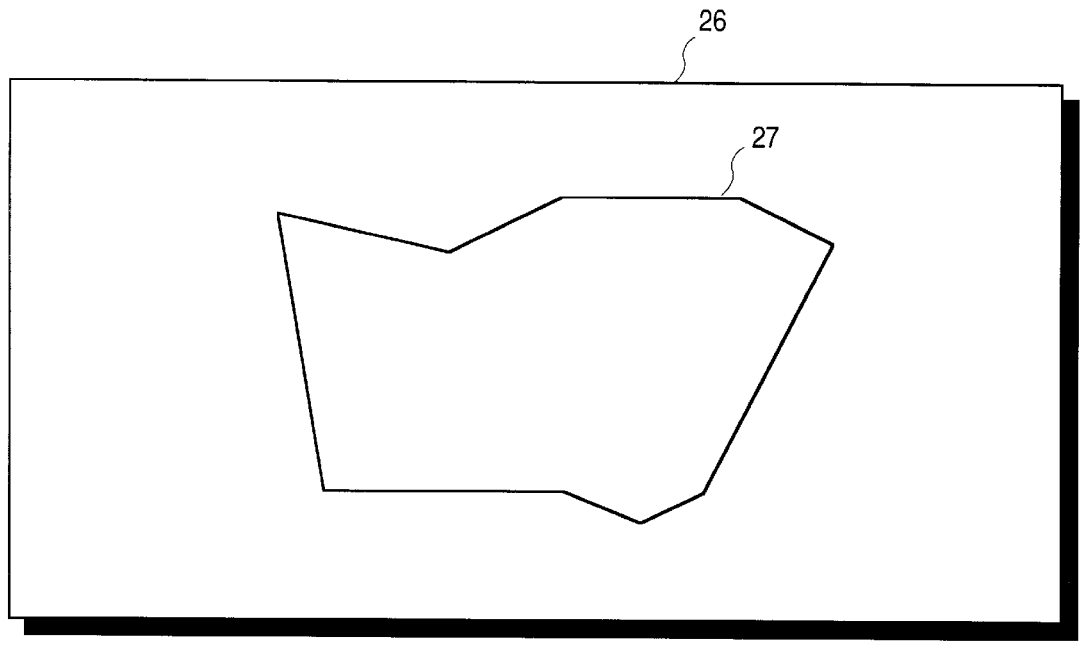
FIGS. 3A and 3B illustrate the representation of a displayable object as a set of triangles.
Figure 3B:
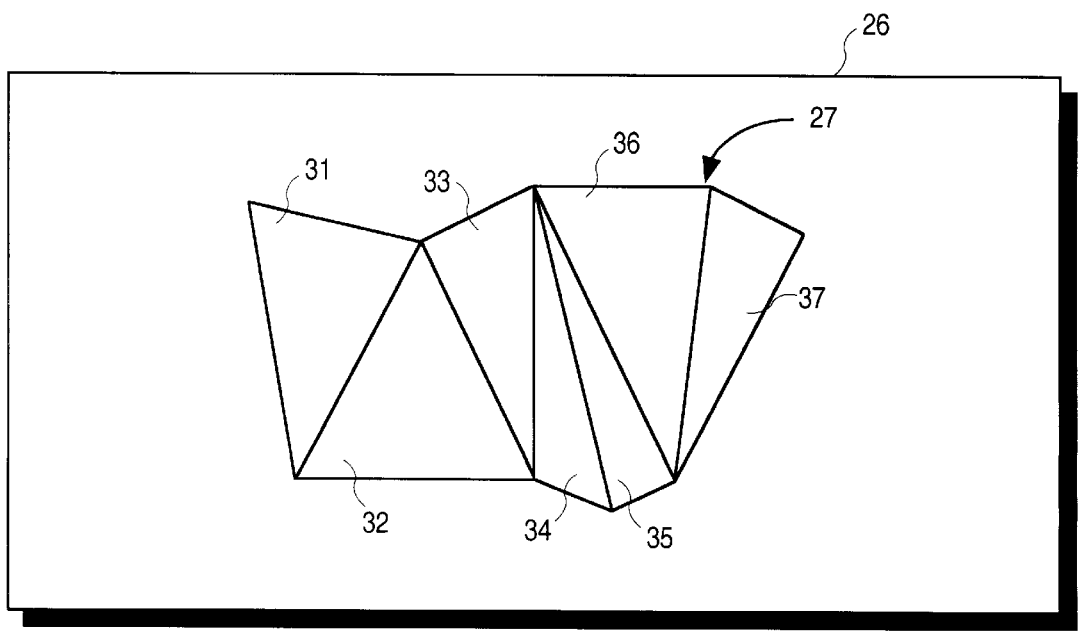
Figure 4:
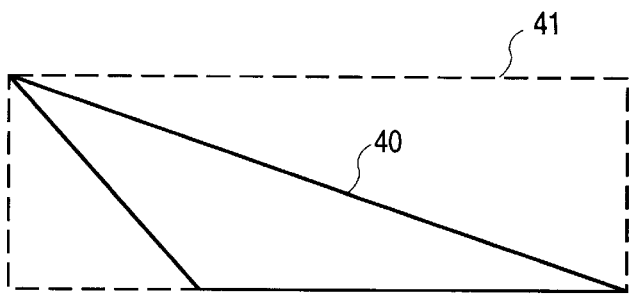
FIG. 4 illustrates the bounding rectangle of a triangle.

Refer now to FIG. 3A, which illustrates an object 27 depicted on a display 26. As can be seen from FIG. 3B, the object 27 can be represented as a number of triangles 31 through 37 using conventional computer graphics techniques. Each triangle has a bounding rectangle defined by the minimum and maximum x (horizontal) and y (vertical) display coordinates of the triangle. Thus, as illustrated in FIG. 4, triangle 40 has a bounding rectangle 41. In addition, each triangle has a "span". A span is defined herein as the set of chunks overlapped by the triangle's bounding rectangle.

Figure 5:
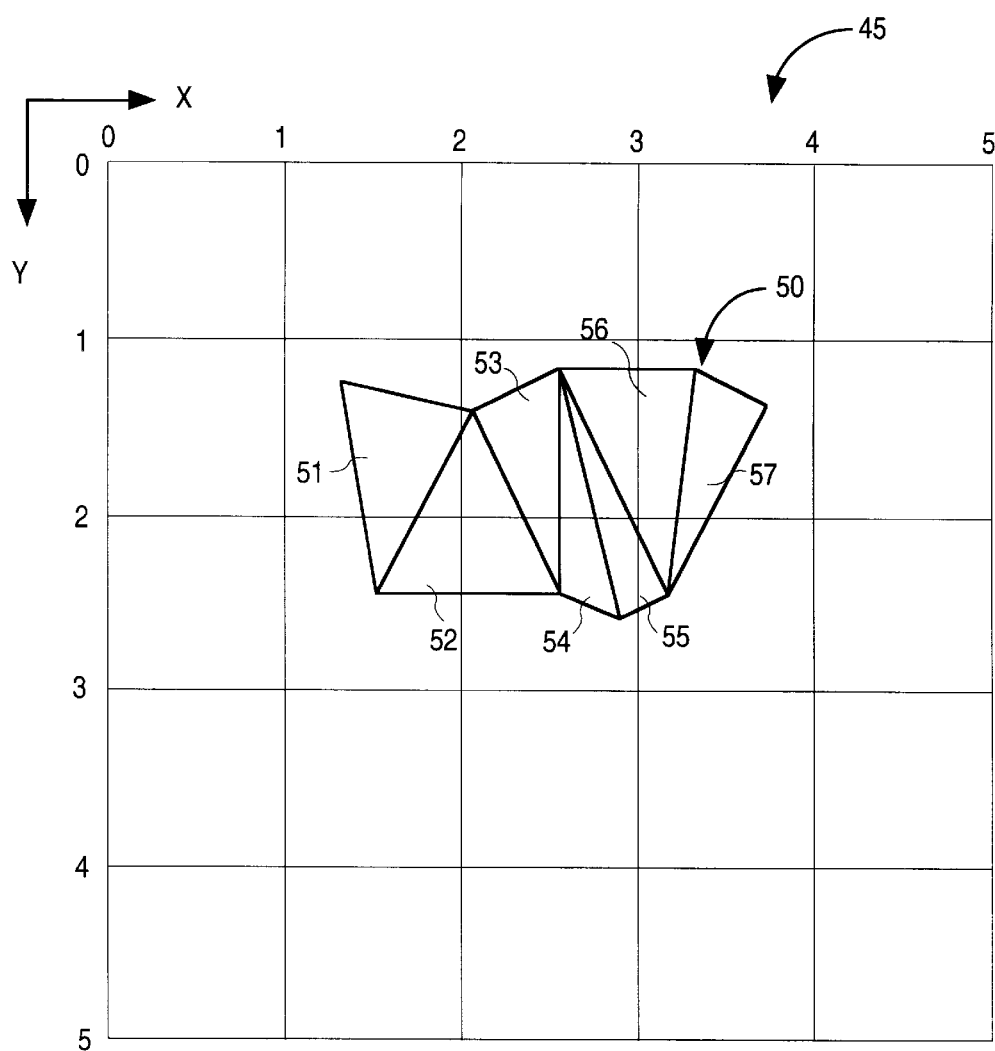
FIG. 5 illustrates an object represented on a display consisting of a number of chunks.

FIG. 5 illustrates an object 50 depicted on a display 45. The display 45 in this example is divided into 25 chunks, i.e., five rows of chunks, each containing five chunks. The object 50 is formed by a number of triangles 51 through 57. Using traditional chunking techniques, a bin would be created for each chunk of the display 45, and each triangle would be assigned to the bin of every chunk which it overlaps, i.e., every chunk in its span.

In contrast, the present invention provides that only a single bin is created for each unique span. Consequently, each triangle is stored in only one bin. As a result, each triangle is provided by the host to the graphics controller only once and is stored in video memory only once. This "bin-per-span" technique therefore reduces the bandwidth requirements between the host and the graphics controller and the storage capacity requirements on the video memory. In general, if an average triangle's span overlaps $C_a$ chunks, then the bin-per-span technique of the present invention effectively reduces the host-to-controller bandwidth and video memory requirements for geometry approximately by factors of $C_a$. The greater available bandwidth and memory can be used to deliver more triangles to the controller and, therefore, to create greater realism for the user in graphics applications.

Figure 6:
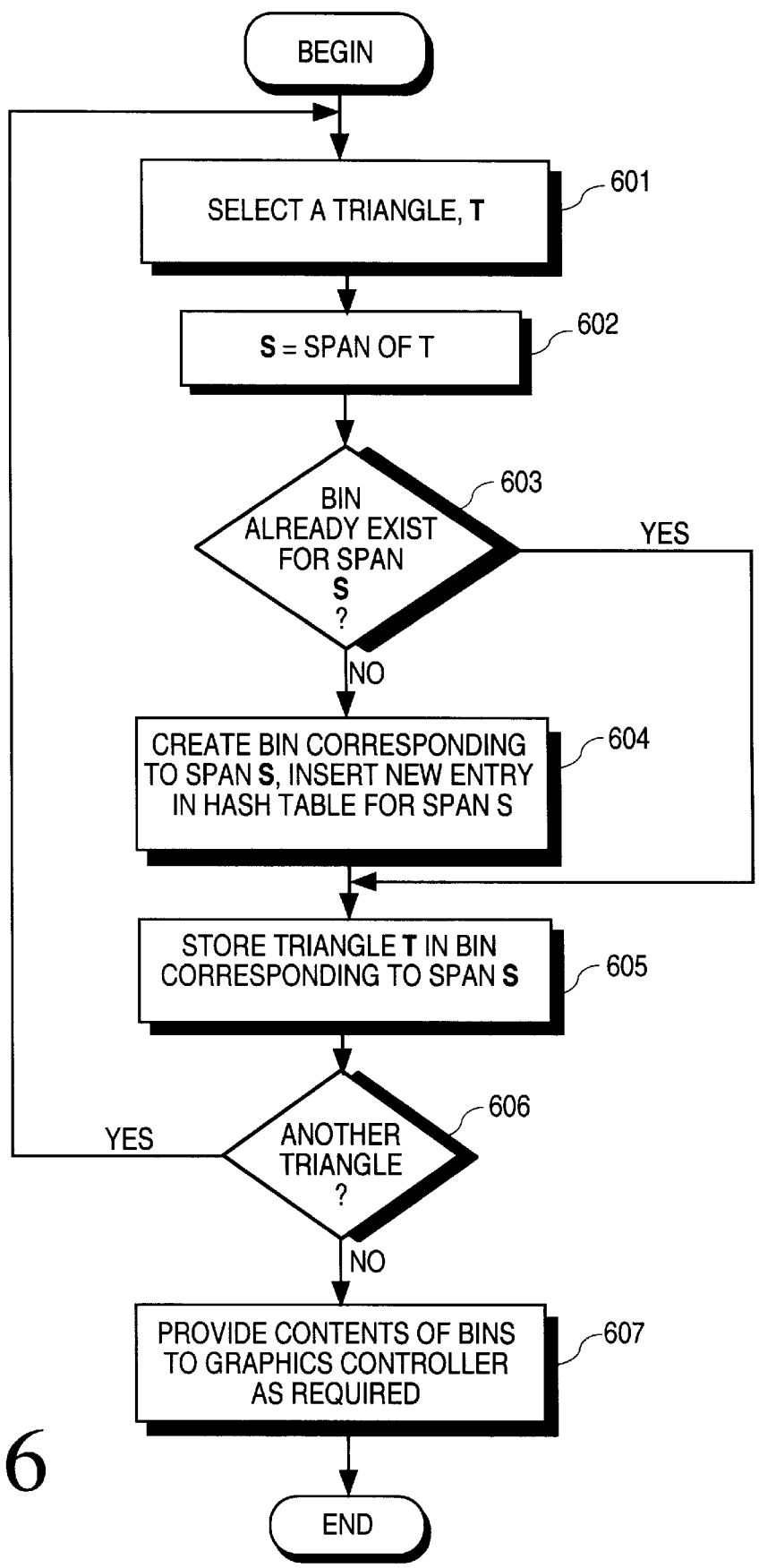
FIG. 6 is a flow diagram illustrating a routine for bin-per-span based representation of graphical data.

FIG. 6 illustrates a routine for allowing the display of graphical data using the bin-per-span technique of the present invention. Initially, a triangle T is selected in step 601, and the triangle's span S is determined in step 602. In step 603, a hash table is used to determine whether a bin already has been created for span S. If not, then in step 604 a bin is created for that span, and an entry is created in the hash table for span S. Once a bin has been created and an entry inserted into the hash table, then in step 605 the triangle T is stored in the (one) bin which corresponds to span S. (More specifically, data identifying the triangle T is stored in the bin corresponding to span S.) If, in step 603, a bin was determined to already exist for span S, then the routine would proceed from step 603 directly to step 605. After storing the triangle in the appropriate bin, if there are additional triangles to process (step 606), then the routine repeats from step 601 with the selection of a new triangle T. Otherwise, the routine proceeds to step 607, in which the contents of the bins are provided to the graphics controller as required. A chunk scene is presented to the graphics controller as a collection of pointers to the bins whose corresponding span is included in the chunk. Thus, each triangle is transferred from the host to the controller memory and stored in the controller memory exactly once.

Referring again to FIG. 5, the advantages of the present invention over the traditional chunking technique are now noted. Note that the example of FIG. 5 is relatively simple in order to more effectively convey an understanding of the present invention. In traditional chunking, one bin is created for each chunk. For purposes of this description, let a chunk be identified using the format X1, Y1→X2, Y2, where X1 represents the lower limit of the chunk's x coordinates, Y1 represents the lower limit of the chunk's y coordinates, X2 represents the upper limit of the chunk's x coordinates, and Y2 represents the upper limit of the chunk's y coordinates. Thus, using the traditional chunking technique, the bin assignments of triangles 51 through 57 of object 50 would be as set forth in Table 1:

TABLE 1

| Bin (per Chunk) | Triangles |
| --- | --- |
| 1,1→2,2 | 51,52, |
| 2,1→3,2 | 51,52,53,54,55,56 |
| 3,1→4,2 | 56,57 |
| 1,2→2,3 | 51,52 |
| 2,2→3,3 | 52,53,54,55,56 |
| 3,2→4,3 | 55,56,57 |

Using the technique of the present invention, a single bin is created for each unique span. Assume that a triangle's span can be represented using a similar format to that used above to represent a chunk, i.e., X1, Y1→X2, Y2, where X1 represents the lower limit of the span's x coordinates, Y1 represents the lower limit of the span's y coordinates, X2 represents the upper limit of the span's x coordinates, and Y2 represents the upper limit of the span's y coordinates. Thus, referring to FIG. 5, triangles 51 and 52 each have the same span, i.e., the span 1, 1→3, 3. Note that while triangle 51 does not overlap chunk 2, 2→3, 3, its bounding rectangle (not shown) does; hence, the upper limit coordinates X2, Y2 of the span of triangle 51 are 3, 3. Similarly, triangles 53 and 54 each have the span 2, 1→3, 3, triangles 55 and 56 each have the span 2, 1→4, 3, and triangle 57 has the span 3, 1→4, 3. Thus, using bin-per-span based representation of data, the bin assignments of triangles 51 through 57 are as shown in Table 2:

TABLE 2

| Bin (per Span) | Triangles |
| --- | --- |
| 1,1→3,3 | 51,52 |
| 2,1→3,3 | 53,54 |
| 2,1→4,3 | 55,56 |
| 3,1→4,3 | 57 |

Table 3 illustrates the total reduction in the number of times a triangle is sent to the graphics controller for the bin-per-span technique as compared to the bin-per-chunk technique, for the example of FIG. 5:

TABLE 3

| Triangle | Number of Times Triangle Sent to Controller--Traditional Chunking | Number of Times Triangle Sent to Controller--Bin-per-Span | Difference |
| --- | --- | --- | --- |
| 51 | 3 | 1 | 2 |
| 52 | 4 | 1 | 3 |
| 53 | 2 | 1 | 1 |
| 54 | 2 | 1 | 1 |
| 55 | 3 | 1 | 2 |
| 56 | 4 | 1 | 3 |
| 57 | 2 | 1 | 1 |
| TOTAL: | 20 | 7 | 13 |

Thus, for the object 50 consisting of only seven triangles and displayed as shown in FIG. 5, a total reduction of 13 triangles is achieved using bin-per-span in comparison to the traditional bin-per-chunk. Again, the example of FIG. 5 is a simple one; hence, the aforementioned numbers are provided only to facilitate understanding and should not be interpreted as a precise indication of the degree of improvement which can be achieved using the present invention.

Thus, a technique for representing, maintaining, and communicating graphical data in a computer system has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of maintaining data for generating a graphical display, the method comprising the steps of:
    representing the data as a plurality of primitives;
    determining a span of each of the primitives, wherein each span is defined according to a bounding rectangle of the corresponding primitive;
    creating a single bin for each span determined in said determining; and
    assigning each of the primitives to the corresponding bin.

2. A method according to claim 1, wherein each of the primitives is a polygon.

3. A method according to claim 2, wherein each of the primitives is a triangle.

4. A method according to claim 1, further comprising the step of providing contents of each bin to a graphics controller, the graphics controller for generating the graphical display, such that data representing each primitive is provided to the graphics controller only once.

5. A computer-implemented method of organizing data for generating a graphical display, the method comprising the steps of:
    representing the data as a plurality of triangles;
    determining a span of each of the triangles, wherein each span is defined according to a bounding rectangle of the corresponding triangle;
    creating one bin for each distinct span determined in said determining; and
    assigning each triangle to the corresponding bin.

6. A method according to claim 5, further comprising the step of providing contents of each bin to a graphics controller, the graphics controller for generating the graphical display, such that data representing each triangle is provided to the graphics controller only once.

7. In a host computer system, a method of providing graphical data to a graphics controller, the graphical data corresponding to a display, the method comprising the steps of:
    representing the data as a plurality of triangles;
    determining a span of each of the triangles, wherein each span is defined according to a bounding rectangle of the corresponding triangle;
    creating one bin for each unique span determined in said determining;
    storing data identifying each of the triangles in a bin, such that the data identifying any given triangle is stored in only one bin; and
    providing the contents of each bin to the graphics controller.

8. An apparatus for organizing data for generating a graphical display, the apparatus comprising:
    means for representing the data as a plurality of primitives;
    means for determining a bounding rectangular span of each of the primitives;
    means for creating a single bin for each span determined in said determining and
    means for assigning each of the primitives to the corresponding bin.

9. An apparatus according to claim 8, wherein each of the primitives is a polygon, the apparatus further comprising means for providing contents of each bin to a graphics controller, the graphics controller for generating the graphical display, such that data representing each polygon is provided to the graphics controller only once.

10. An apparatus according to claim 9, wherein each of the polygons is a triangle.

11. A computer system comprising:
    a processor; and
    a memory coupled to the processor, the memory having stored therein data for generating a graphical display, wherein the processor is configured to:
    represent the data as a plurality of polygons;
    determine a span of each of the polygons, wherein each span is defined according to a bounding rectangle of the corresponding polygon;
    create one bin for each determined distinct span; and
    assign each triangle to the corresponding bin.

12. A computer system according to claim 11, further comprising a graphics controller coupled to the processor, the graphics controller for generating the graphical display, wherein the processor is further configured to cause contents of each bin to be transferred to the graphics controller, such that data representing each polygon is provided to the graphics controller only once.

13. A machine-readable storage device having stored therein sequences of instructions for causing a machine to maintain data for generating a graphical display, the instructions for causing the machine to perform the steps of:

representing the data as a plurality of triangles;

determining a span of each of the triangles, wherein each span is defined according to a bounding rectangle of the corresponding triangle;

creating a bin for each span determined in said determining; and assigning each triangle to the one bin corresponding to the span of said triangle.

14. A machine-readable storage device according to claim 13, wherein the instructions are further for causing the machine to perform the step of providing contents of each bin to a graphics controller, the graphics controller for generating the graphical display, such that data representing each triangle is provided to the graphics controller only once.

15. A method of maintaining data for generating a visual display on a display device, wherein the display device is divided into a plurality of fixed-size chunks, the method comprising:

representing the data as a plurality of primitives, at least some of which are specified to overlap two or more of the chunks;

determining a span of each of the primitives;

creating a single bin for each span determined in said determining; and assigning each of the primitives to the corresponding bin, such that each of the primitives is stored in only one bin, wherein the contents of each bin are used subsequently for displaying the primitives on the display device.

16. A method according to claim 15, wherein each of the primitives is a polygon.

17. A method according to claim 16, wherein each of the primitives is a triangle.

18. A method according to claim 16, further comprising providing the contents of each bin to a graphics controller, such that data representing each triangle is sent to the graphics controller only once for a given state of the display device.

19. A method of maintaining data for generating a visual display on a display device, the method comprising:

representing the data as a plurality of primitives;

determining a span of each of the primitives;

dynamically creating a set of bins for storing the primitives based on the data by creating a single bin for each span; and assigning each of the primitives to the corresponding bin.

20. A method according to claim 19, wherein each of the primitives is a polygon.

21. A method according to claim 19, wherein each of the primitives is a triangle.

22. A method according to claim 19, further comprising providing the contents of each bin to a graphics controller, such that data representing each triangle is sent to the graphics controller only once for a given state of the display device.

* * * * *